United States Patent

[11] 3,555,175

[72] Inventor Dal F. Griepentrog
Indianapolis, Ind.
[21] Appl. No. 731,038
[22] Filed May 22, 1968
[45] Patented Jan. 12, 1971
[73] Assignee RCA Corporation
a corporation of Delaware

[54] KINESCOPE BIAS TRACKING CIRCUITS

8 Claims, 1 Drawing Fig.

[52] U.S. Cl. .......... 178/5.4, 178/7.5
[51] Int. Cl. .......... H04n 9/16
[50] Field of Search .......... 178/5.4, 5.4(4d), 7.3DC, 7.3E, 7.5DC, 7.5E; 315/30, 30X

[56] References Cited

UNITED STATES PATENTS 2,800,528 7/1957 Beste .......... 178/7.5E
2,935,556 5/1960 Barco .......... 178/5.4
3,449,619 6/1969 Stalp .......... 315/30X
3,469,142 9/1969 Bellemare .......... 315/30

*Primary Examiner*—Richard Murray
*Assistant Examiner*—George G. Stellar
*Attorney*—Eugene M. Whitacre

ABSTRACT: A circuit functions to make the kinescope grid electrode bias track with the cathode electrode bias in a direction to maintain a constant difference therebetween for changes in AC line voltage.

A Zener diode is coupled across a source of clamping pulses to maintain the level of clamping pulses used to operate a DC restoring circuit for the grid electrode of the kinescope, constant; which, in effect, assures a constant potential difference between the grid and cathode electrodes, both of which are biased from an unregulated supply, subject to potential variations.

PATENTED JAN 12 1971 3,555,175
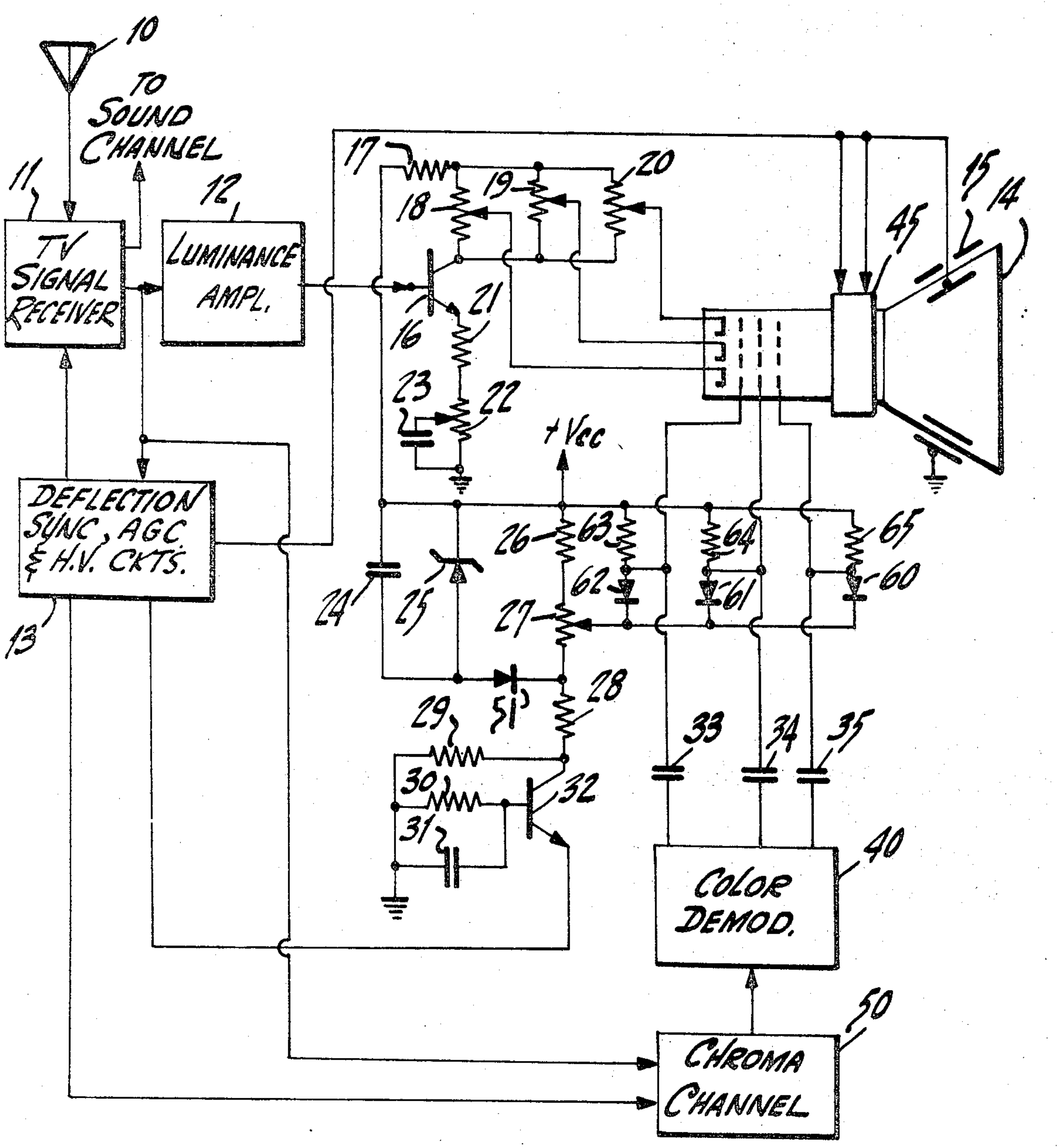
INVENTOR
Dal F. Griepentrog
BY Eugene M. Whitacre
ATTORNEY

KINESCOPE BIAS TRACKING CIRCUITS

This invention relates to television receivers and more particularly to a circuit which functions to allow the bias on a kinescope to track with variations in power supply potentials.

In most conventional receivers it is desirable to use economical components and circuit techniques for the fabrication of the receiver, in general, and the design of power supplies as well. With this philosophy it would be more economical to design a receiver which utilizes nonregulated supplies instead of a receiver which would require expensive and sophisticated regulated supplies. However, this becomes more difficult for a color television receiver as compared to a black and white receiver. In color television receivers the drive requirements for the kinescope are more stringent in terms of maintaining suitable signal and bias levels at the grid and cathode electrodes of the device. Due to the various conditions and requirements necessary to generate a proper color display, it then becomes increasingly important to maintain especially, the bias between the grid and cathode electrodes of a color kinescope relatively constant over the normal operating range. In this manner one can be sure that the intensity of light emanating from the viewing screen of the kinescope remains at a desired level for the information being transmitted. However, in spite of the desire to maintain such potentials within a defined operating range various factors, not within the control of the designer of such a receiver, serve to effect operating potentials in the receiver which in turn may disturb the bias between the grid and cathodes of the kinescope. Such changes may result from AC line variations due to various conditions which concern the quality of the power transmission lines in that particular section where the receiver happens to be operating. While the intent is to use nonregulated supplies for economical purposes, such supplies are more prone to vary with such line variations and hence their operation results in a distorted picture as the bias on the kinescope will be affected.

It is therefore an object of the present invention to provide a circuit which maintains the bias between the grid and cathode electrodes of a kinescope at a predetermined level unaffected by variations in line voltage.

It is a further object to provide a circuit for a color television receiver using nonregulated supplies which serves to apply a bias to a kinescope according to such changes in line voltage.

These and other objects of the present invention are accomplished in one embodiment thereof by a circuit which serves to operate on the kinescope grid bias to assure that bias will vary in a direction to allow the grid to cathode bias to track with AC line changes.

The circuit uses a zener diode coupled between a nonregulated power supply and a collector electrode of a clamping transistor. The clamping transistor operates in combination with three synchronous clamping diodes to restore the grid electrodes of the kinescope to a desired DC potential during each television line. In this manner the restored grid potential is kept at a desired level with reference to the DC potential at the cathode to assure proper operating bias. A cathode driver amplifier operates from the same unregulated supply and hence the DC coupled via this cathode drive circuit changes with line variations, as effecting the magnitude of the potential from the unregulated supply. However, due to the nature of the grid circuits if the zener diode were omitted changes in this regulated supply would be canceled out by the operation of the diode clamps. Therefore the cathode bias would change with line voltage whereas the grid voltage would not. The zener operates to maintain the pulse across the load resistor in the clamping circuit constant and thus permit the potential across the diode clamps to vary as the cathode potential varies due to line voltage variations, maintaining the relative bias between the grid and cathodes fixed.

Referring to the FIG. an antenna 10 receives radio frequency television signals. The television signal receiver 11 coupled to the antenna 10 functions to process the signals by converting the radio frequency to intermediate frequency or I.F. signals by means of conventional and known techniques. Such techniques may employ a mixer and a local oscillator and suitable stage of amplification to obtain the television intermediate frequency. A video detector, also included within rectangle 11, has an input coupled to the I.F. amplifier therein and is responsive to the I.F. signal to derive therefrom a composite television signal. The composite television signal is applied to an input of a luminance amplifier 12. Another output from the television signal receiver 11 is also coupled to an input of a sound channel, not shown, which serves to detect the frequency modulation sound carrier and sidebands thereof to provide a signal representative of the audio transmitted for eventual application to a sound circuit including a loudspeaker. The luminance amplifier 12 serves to amplify luminance or monochrome information contained in the composite television signal for eventual application to the appropriate electrodes of a kinescope 14. Accordingly, an output of the luminance amplifier is shown coupled to the base electrode of a transistor 16 which operates as a video driver for providing large amplitude luminance signals to the cathodes of the kinescope 14. Transistor 16 has an emitter electrode coupled to a point of reference potential through a cathode bias and degenerating resistor 21 in series with a second bias resistor 22. Resistor 22 is bypassed by means of a capacitor 23 whose location across resistor 22 is adjustable, hence effecting the total gain of the output amplifier according to the amount of resistance 22 that is bypassed. Such a control is normally referred to as a contrast control as effecting only the AC gain of the luminance amplifier. The collector electrode of transistor 16 is coupled to a common terminal of three parallel potentiometers 18, 19 and 20. A second common terminal of these three potentiometers 18 to 20 is coupled through a load resistor 17 to a source of unregulated potential designated as $+V_{cc}$. The variable arm of each potentiometer 18, 19 and 20 is coupled to a respective different one of the three cathode electrodes associated with the color kinescope 14, which may for example be, a three gun shadow mask tube. In the above described circuit a variation of the tap of any one of the three potentiometers 18, 19 and 20 results in a different amount of drive being supplied to the respective cathode. The luminance amplifier 12 together with the video drive 16 provides a direct coupled path for luminance signals as being applied to the cathodes of the kinescope 14.

A conventional television receiver also includes deflection, sync, A.G.C. and high voltage circuits 13 which in combination provide functions necessary to present a television display. Rectangle 13 includes deflection circuits as horizontal and vertical generators which serve to deflect the electron beams supported by the kinescope 14 in a direction and a manner to produce a raster. Accordingly two outputs from rectangle 13 are coupled to a deflection yoke 45 associated with the kinescope 14. A vertical and horizontal generator described above are operated in synchronism with vertical and horizontal synchronizing information contained in the composite signal and retrieved by means of a sync separator also included in rectangle 13. The function of the sync separator is to remove such synchronizing information from the composite signal for application to the deflection generators.

The automatic gain control circuit or A.G.C. circuit serves to monitor the amplitude of the incoming signal and derive a control voltage which varies according to received signal variations. The control voltage is then applied to suitable amplifiers contained in the television signal receiver 11 to change amplification factors in a direction which tends to maintain the television signal substantially constant.

Suitable pulses developed within the deflection and high voltage circuits 13 are utilized, by means of a voltage step up transformer or other suitable device, to generate compatible operating potentials necessary to properly drive the color kinescope 14. In this manner a lead is shown from rectangle 13 to the ultor or second anode electrode 15 of the kinescope 14. There are, of course other potentials necessary to operate a color kinescope as 14 which, are for the screen supply and the focus supply and are not shown as not being part of this invention.

A conventional color television receiver contains a chroma channel 50 which functions to process the color or chroma information also contained in a composite video signal for eventual application to the appropriate electrodes of the kinescope, which may for example be the grid electrodes. The output of the chroma channel 50 is coupled to an input of color demodulators 40. The color demodulators function to operate on the chroma information processed by the chroma channel and serve to demodulate the same with reference to a signal obtained from a color subcarrier oscillator which may be included within rectangle 50 or rectangle 40.

During a color transmission approximately eight cycles of 3.58 MHz which frequency corresponds to the color subcarrier utilized at the color transmitter is sent with the composite transmitted video signal and appears at the back porch of the horizontal sync pulse. A burst separator circuit gated by a suitable pulse derived from the deflection and high voltage circuit 13 retrieves this burst information and couples the same to a 3.58 MHz oscillator contained in the receiver. The oscillator is thus synchronized both in phase and frequency to the retrieved color burst and serves to provide a reference frequency for proper operation of the color demodulators 40. Such techniques provide color difference signals such as B-Y, G-Y and R-Y which can be utilized for eventual application to the grid electrodes of the kinescope, in which matrixing takes place to produce the three color signals R. Y, and G. To simplify the design requirements imposed on the color television receiver the color difference signals are sometimes AC coupled to the grid electrodes of the kinescope. In this manner three outputs from the color demodulators 40 are shown independently coupled through separate capacitors as 33, 34 and 35. A terminal of each capacitor is coupled to an appropriate grid electrode of the kinescope 14. In order to reference the grid electrodes at a suitable potential with respect to the cathode electrodes, the grid electrodes are each independently clamped during the horizontal retrace interval associated with each television line. The time constants associated with these clamp circuits are sufficient to maintain the grid electrode at a suitable potential during the entire line. At the end of the line a suitable potential is again restored on the grids assuring proper operation of these electrodes with respect to the cathode. The clamping circuits are referred to in the art as synchronous clamps. There is one such clamp circuit for each grid electrode of the kinescope 14. A clamp circuit comprises a resistor 63 having one terminal coupled to the $+V_{cc}$ supply and its other terminal coupled to the grid electrode of the kinescope 14 and to the anode electrode of clamping diode 62. The cathode of diode 62 is coupled to an arm of a potentiometer 27 forming part of the collector electrode load of a clamping transistor 32 which will be described subsequently. A second grid electrode has a clamping circuit in parallel with the first clamping circuit and comprises a resistor 64 in series with a diode 61. The junction between a terminal of resistor 64 and the anode of diode 61 is returned to the second grid electrode of the kinescope. Still a third clamping circuit for the third grid electrode, also in parallel with the above described clamping circuits, comprises a resistor 65 in series with a diode 60. The junction between the anode of diode 60 and a terminal of resistor 65 being returned to the third grid electrode of the kinescope. As was mentioned previously the clamping circuits just described will be energized during the horizontal retrace interval and serve to charge the capacitors 33 and 35 in a direction to bias the respective three grid electrodes at an appropriate quiescent level with respect to the cathode electrodes of the kinescope 14. The clamping pulse is obtained by coupling the emitter electrode of transistor 32 to a suitable terminal of the deflection high voltage circuits 13. The collector of transistor 32 is returned to the unregulated $+V_{cc}$ supply through the series resistors 28, 27 and 26. Resistor 27 is a potentiometer having its variable arm coupled to the cathodes of diodes 60, 61 and 62 which form part of the above described clamping circuits. The base electrode of transistor 32 is returned to ground by resistor 30, and which is bypassed for AC by capacitor 31. A resistor 29 is coupled between the collector electrode of transistor 32 and a point of reference potential, and its magnitude is selected to protect transistor 32 from excessive pulse amplitude of the collector electrode thereof, which may otherwise cause collector to emitter breakdown.

A pulse regulator circuit comprises a zener diode 25 having the cathode electrode coupled to the unregulated $+V_{cc}$ source and its anode electrode coupled to a point on the resistor collector load of transistor 32 through a diode 51. A capacitor 24 appears in shunt with the zener diode 25.

The operation of the circuit is as follows: The luminance channel comprising the luminance amplifier 12 and the video driver stage 16 is direct coupled to the cathode electrodes of the kinescope 14. Due to the lower power dissipation and lower signal levels the transistorized luminance amplifier 12 is referenced to a low voltage regulated supply which may, for example, be approximately 15 volts. Hence this low voltage supply does not vary potential level with changes in AC line voltage. Accordingly the base drive of the video output transistor 16 does not change. This specifies a constant collector current for the video output stage and therefore a constant voltage drop across resistors 17, 18, 19 and 20, which are those forming the collector load impedance of transistor 16. However, the $+V_{cc}$ supply, which is a high voltage supply (i.e. 200 volts or more), for reasons of economy, is not regulated and the potential levels therefrom vary with AC line. In this manner the voltage at the collector of transistor 16 varies with AC line variations as this voltage is equal to the $+V_{cc}$ minus the constant drop across the collector load of transistor 16. It is then seen that the voltage coupled to the cathode electrodes of the kinescope 14 also varies with AC variations. As is well known, the anode or beam current and the cutoff level for the kinescope 14 depends on the relative bias between the grid and cathode electrodes of the kinescope, i.e., the potential difference between these electrodes determine the above. The grid electrodes of kinescope 14 are biased by means of the synchronous clamp circuits comprising diodes 60 to 62, resistors 63 to 65 and capacitors 33 to 35. The grid electrodes are DC restored during a repetitive interval occurring for each television line and referred to as the horizontal retrace interval. During this time the chroma channel 50 is subjected to a burst elimination pulse which serves to render the same inoperative. This condition causes the output of the demodulator 40 to return to a quiescent level which sets up the clamping reference. Transistor 32 is gated on, or into conduction, by means of a large negative retrace pulse coupled from the deflection and high voltage circuits 13. The collector load of transistor 32 is coupled to the $+V_{cc}$ unregulated supply. The voltage drop across this load without the zener diode 25, would then vary with AC line variations as the current drawn by transistor 32 would so vary. Hence the voltage or pulse amplitude coupled to the diode clamps via resistor 27, would vary. In this manner the DC potential that the grids would be restored to, would be equal to $+V_{cc}$ minus the drop across the collector load which would also vary. Hence the grid to cathode voltage on the kinescope 14 is no longer constant as it is essentially equal to $$V_{g-k} \cong (V_{cc} \pm \Delta V - V_{gc}) - (V_{cc} \pm \Delta V - V_c)$$

$$V_{g-k} \cong -V_{gc} + V_k$$

where $V_{cc}$ = Normal potential of $+V_{cc}$ supply
$V_{g-k}$ = Voltage drop from grid to cathode of kinescope 14
$\pm\Delta V$ = Change in voltage due to a.c. line variations
$V_{gc}$ = Voltage drop across R26 and R27 (not constant)
$V_k$ = Voltage drop across R17 and the parallel combination of R18, R19 and R20, which is constant.

Zener diode 25 appearing across resistors 26 and 27 functions as follows. As transistor 32 is switched into conduction by the large negative pulse coupled to the emitter electrode the collector goes negative this negative transition appears across the anode of zener 25 which is switched in its zener region and hence causes the voltage across resistors 26 and 27 to be fixed (i.e. equal to the zener rating of diode 25 minus a trivial drop due to that across diode 51). This determines that $(V_{gc}=V_z=\text{constant})$ where $V_z$=zener diode rating. Hence $V_{g-k}=-V_z+V_k=$ constant.

As the zener 25 is switched in and out of its zener region at a rate determined by the horizontal repetitive or line rate, capacitor 24 and diode 51 serve to suppress radiation due to stray capacity and inductance. Radiation would be caused by resonant circuits formed by stray capacitance and inductance, and caused to ring or resonate because of the switching rates involved with the operation of zener diode 25 (i.e. ≅ 15,734 for color, 15,750 for black and white). Capacitor 24 serves to swamp out stray C's while diode 51 offers a discharge path for any charge stored across capacitor 24. Of course, the diode 51 and capacitor 24 are optional and may be included only if radiation is a problem.

A circuit using the principles of the above described invention operated with the following component values.

| | | |
|---|---|---|
| Resistor 17 | ohms | 4,700 |
| Resistor 18, 19, 20 | ohms [1] | 7,500 |
| Resistor 21 | ohms | 100 |
| Resistor 22 | ohms [1] | 350 |
| Resistor 26 | ohms | 22,000 |
| Resistor 27 | ohms [1] | 5,000 |
| Resistor 28 | ohms | 4,700 |
| Resistor 29 | do | 100,000 |
| Resistor 30 | do | 1,800 |
| Resistors 63, 64, 65 | do | 2,200,000 |
| Capacitors 33, 34, 35 | microfarads | .01 |
| Capacitor 23 | do | 30 |
| Capacitor 31 | do | .0039 |
| Diodes 60, 61, 62 | RCA #1471872-1 | |
| Transistor 16 | | |
| Transistor 32 | RCA #1473584 | |
| Diode 25 | 180 volt zener | |
| Capacitor 24 | These components are optional (see spec.) | |
| Diode 51 | | |
| $+V_{cc}$ | +250 volts (unregulated) | |
| Kinescope 14 | 25 x P22 or equivalent | |

[1] Variable.

I claim:

1. In a television receiver having a luminance amplifier chain with an output direct coupled to a cathode electrode of a kinescope and a clamping circuit associated with a kinescope grid electrode for restoring the same to a DC potential with respect to that potential on the cathode to provide a predetermined potential difference therebetween, said cathode electrode as coupled to said luminance amplifier subject to a change in quiescent potential due to fluctuations of an unregulated power supply energizing that portion of said luminance amplifier driving said cathodes, said clamping circuit being biased from said unregulated supply and operated by a pulse formed by deflection circuitry included in said receiver during a horizontal retrace interval, which pulse amplitude is also effected by said fluctuations, said fluctuations of said pulse amplitude together with said unregulated bias source serving to combine to eliminate said fluctuations from affecting said grid electrode potential as clamped by said circuit, thereby causing said cathode to grid potential to vary according to the affects of said fluctuations on said cathode electrode, in combination, therewith, means coupled between said unregulated power supply and said clamping circuit responsive to said pulse amplitude as compared to said unregulated power supply potential for regulating said pulse amplitude at a given specified level, whereby said clamped kinescope grid electrode potential varies only according to said unregulated bias source, as does said cathode potential, to maintain said grid to cathode potential relatively constant with said fluctuations.

2. Apparatus for use in a color television receiver employing a kinescope having at least one control electrode thereof AC coupled to a source of video information, comprising:

a. a transistor having a base, collector and emitter electrode;
b. A source of unregulated potential;
c. a resistor divider coupled between said collector electrode of said transistor and said source of unregulated potential, for supplying an operating potential thereto;
d. means for returning the base electrode of said transistor to a point of reference potential, to bias said transistor in a normally nonconducting state;
e. a network, including a series resistor and diode coupled between a point on said resistor divider and said unregulated source, the junction between said resistor and diode coupled to said control electrode of said kinescope, which electrode is AC coupled to said source of video information;
f. voltage regulating means having two terminals, one terminal thereof coupled to said unregulated source and said other terminal coupled to said collector electrode, said regulator thus being in shunt with said resistor divider;
g. means coupled to said emitter electrode for pulsing said transistor into current conduction in a direction to cause said voltage regulator to maintain a fixed potential pulse across said resistor divider and therefore across said series network whereby any fluctuations due to variations of potential level of said unregulated supply do not effect said pulse amplitude as applied to said junction between said series resistor and diode.

3. The apparatus according to claim 2 wherein, said voltage regulating means comprises a zener diode having an anode electrode coupled to said collector electrode and a cathode electrode coupled to said unregulated source.

4. In a color television receiver employing a color kinescope having cathode and grid electrodes for determining a specified amount of beam current drawn by said kinescope as a function of the potential difference between said grid and cathode electrodes, means for direct coupling said cathode to a source of luminance signals, said means including a transistor whose base electrode drive is constant but whose collector operating potential is derived from an unregulated source capable of exhibiting variations in said operating potential as a function of AC line variations, said grid electrodes capacitively coupled to color demodulators and direct coupled to synchronous clamping circuits each comprising a diode and resistor connected between said unregulated source and a first terminal, the junction between the anode of said diode and said resistor being coupled to said grid electrode said clamps when operated by a suitable amplitude pulse, function to charge said capacitors coupling said color demodulators to a predetermined DC potential, in combination therewith, comprising:

a. A transistor having a base, collector and emitter electrode;
b. means coupling said collector electrode to said unregulated source and said first terminal;
c. means coupled to said base electrode for biasing said transistor in a normally nonconducting state;
d. a voltage reference device coupled in shunt with said unregulated source and said first terminal; and
e. means coupled to said emitter electrode of said transistor for pulsing said transistor to a conducting state in a direction to cause said voltage reference device to operate to maintain any potential variation, due to said said conduction, constant between said unregulated source and said first terminal, whereby said grid to cathode potential difference of said kinescope remains substantially constant.

5. The combination according to claim 4 wherein said means coupled to said base electrode is a resistor and a capacitor in shunt, connected between said base electrode and a point of reference potential.

6. The combination according to claim 5 further comprising a resistor connected between the collector electrode of said transistor and a point of reference potential, and of a magnitude selected to prevent collector to emitter breakdown of said transistor when being pulsed to said conductive state.

7. The combination according to claim 5 further comprising:

a. a capacitor coupled in parallel with said voltage reference device; and b. a diode in series with said voltage reference device and said collector electrode of said transistor, said capacitor and diode serving to inhibit radiation from said device when caused to operate due to said transistor conducting.

8. Apparatus for use in a television receiver, comprising:

a. a low level amplifier responsive to luminance information contained in a composite video signal, said amplifier operated from a low voltage regulated supply for providing at an output thereof a relatively constant amplitude luminance signal;

b. a second amplifier having an input coupled to said output of said low level amplifier and operated from a substantially high voltage nonregulated supply for providing at an output thereof a larger amplitude level luminance signal;

c. a kinescope, having at least a cathode and grid electrode, said cathode electrode being direct coupled to said output of said second amplifier electrode used for driving said cathode electrode and for quiescently biasing the same from said unregulated supply to cause said cathode potential to vary with any variations of said nonregulated supply;

d. a source of color difference signals capacitively coupled to said grid electrode of said kinescope for signal driving said grid electrode;

e. clamping means coupled between said unregulated supply and said grid electrode for charging said capacitive coupling to restore a DC bias to said grid electrode when operated by a suitable amplitude and polarity pulse, said restored DC bias determined by any variations in said nonregulated supply and said pulse amplitude; and f. means coupled between said clamping means and said nonregulated supply for pulsing said clamping means into operation with a suitable polarity pulse whose amplitude is substantially constant and independent of any fluctuations in said potential of said unregulated supply, whereby said bias on said grid electrode as DC restored by said clamp varies only with said any variations of said nonregulated supply as does said cathode electrode.